J. F. O'CONNOR.
FRICTION SHOCK ABSORBING MECHANISM.
APPLICATION FILED OCT. 24, 1921.
1,433,294.
Patented Oct. 24, 1922.
2 SHEETS—SHEET 1.
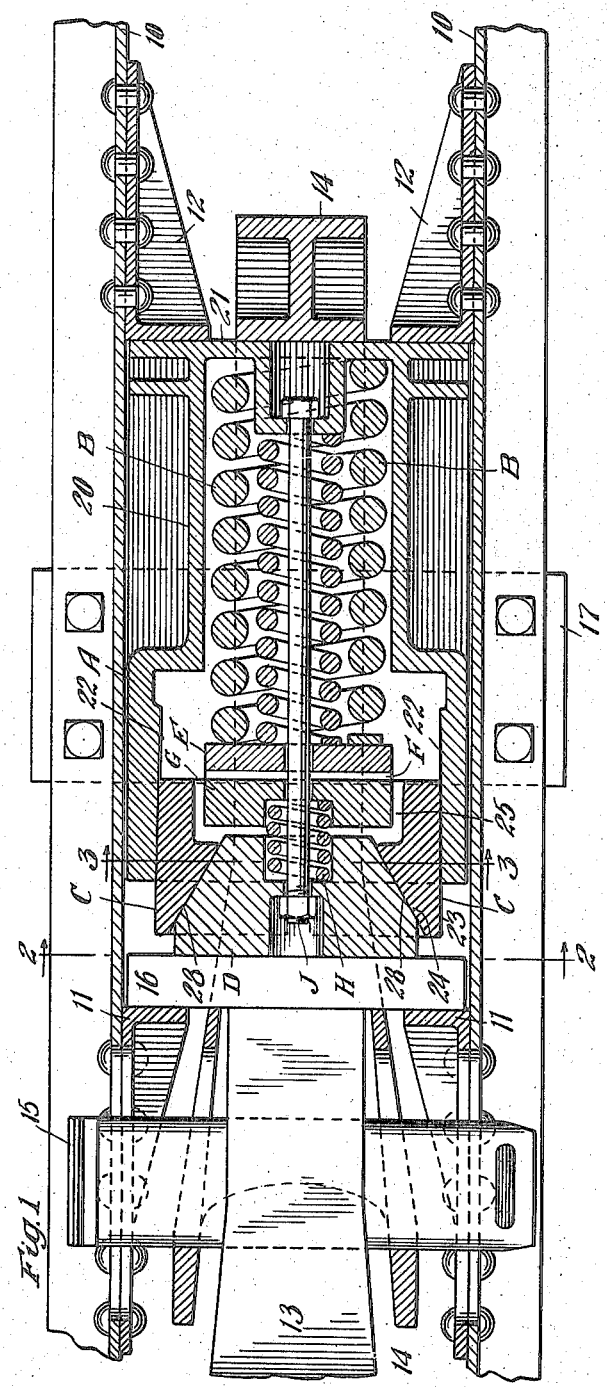
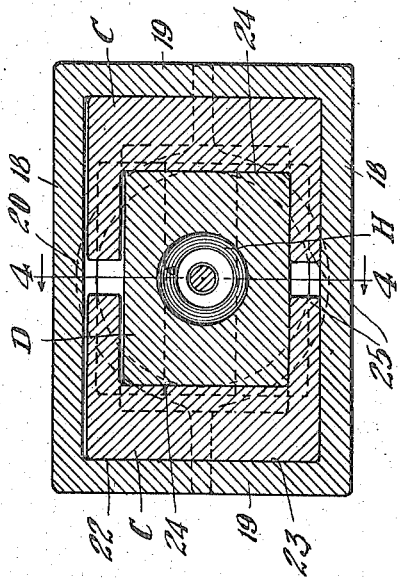
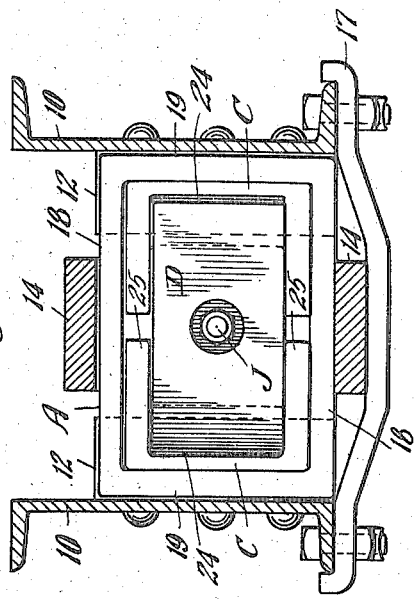
Witnesses
Wm. Geiger
Inventor
John F. O'Connor
By Geo. I. Haight
His Atty.

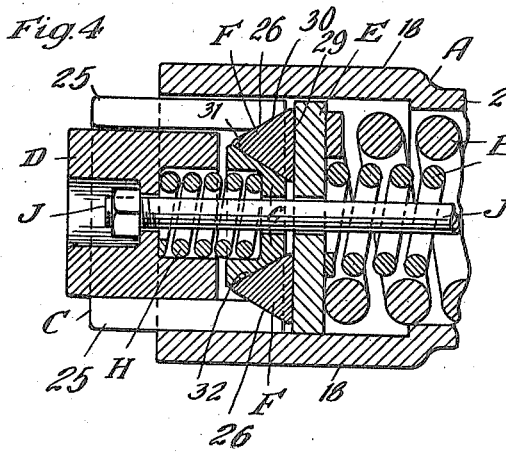
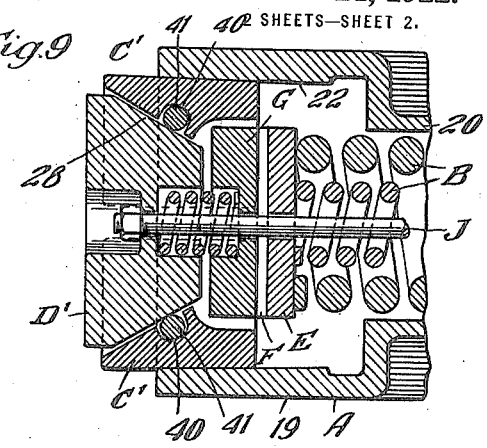
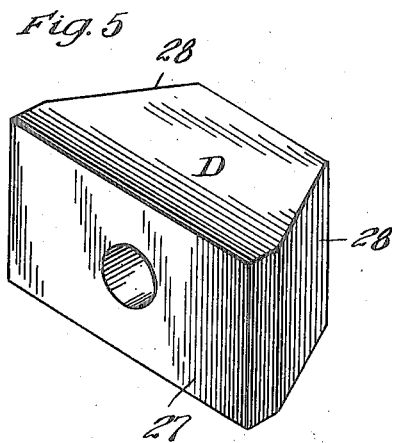
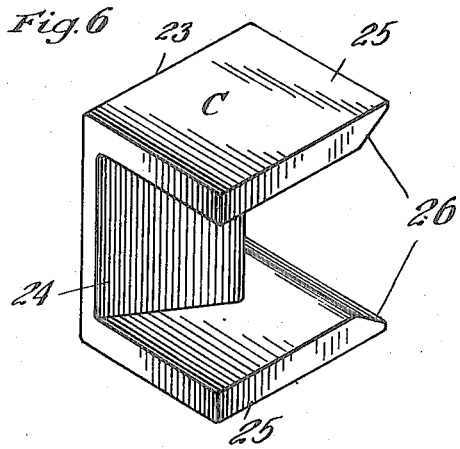
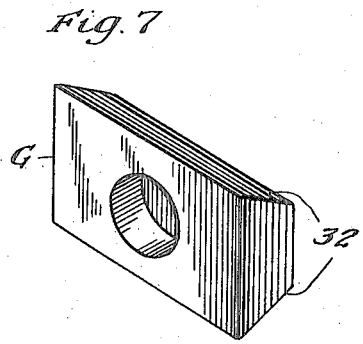
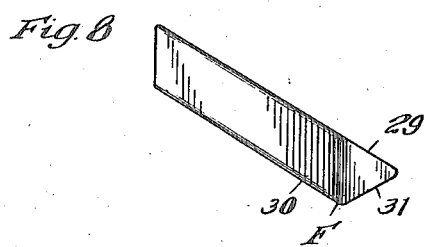

Patented Oct. 24, 1922.

1,433,294

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed October 24, 1921. Serial No. 509,770.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of this invention is to provide a durable, efficient and high-capacity friction shock absorbing mechanism, especially adapted for railway draft riggings and wherein are employed certain means for facilitating the release of the friction elements.

In the drawings forming a part of this specification, Figure 1 is a horizontal longitudinal sectional view of a portion of a railway draft rigging showing my improvements in connection therewith. Fig. 2 is a vertical transverse sectional view taken substantially on the line 2—2 of Fig. 1. Fig. 3 is an enlarged transverse vertical sectional view of the shock absorbing mechanism proper corresponding to the line 3—3 of Fig. 1. Fig. 4 is a longitudinal vertical sectional view, parts being broken away, corresponding to the line 4—4 of Fig. 3. Figs. 5, 6, 7 and 8 are detail perspectives of the main wedge, one of the friction-shoes, a supplemental wedge, and an inner wedge, employed in my construction. And Fig. 9 is a view similar to Fig. 1 illustrating another embodiment of the invention.

Referring to the construction illustrated in Figs. 1 to 8 inclusive, 10—10 denote channel draft sills of a car underframe to the inner faces of which are secured front stop lugs 11 and rear stop lugs 12. A portion of a drawbar is indicated at 13, the same being operatively associated with the shock absorbing mechanism proper by a hooded cast yoke 14 and coupler key 15. The shock absorbing mechanism proper, hereinafter described, and a front follower 16 are contained within the yoke and are supported with the latter by means of a detachable saddle plate 17.

The improved shock absorbing mechanism proper, as shown, comprises a combined friction shell and spring cage casting A; a main spring resistance B; a pair of friction shoes C—C; a main wedge D; a spring follower E; inner wedges F—F; a central wedge G; a compensating spring H; and a retainer bolt J.

The casting A is of generally rectangular form having upper and lower horizontal walls 18—18, side walls 19—19, the rectangular formation changing to a cylindrical formation as indicated at 20 to provide a centering spring cage, said casting having also an integral rear wall 21 adapted to act as the follower in conjunction with the stop lugs 12. The friction shell proper is at the outer or forward end of the casting A and, as will be seen from Figs. 1, 2 and 3, is of rectangular shape providing a pair of opposed longitudinally extending friction surfaces 22—22 which are preferably slightly tapered inwardly of the mechanism.

The two friction shoes C—C are of like construction and each is formed on its outer side with a longitudinally extending friction surface 23 cooperable with a corresponding shell surface 22. On its inner side, each shoe C is provided with a wedge face 24 and also with a pair of upper and lower horizontally extending wings 25—25 which straddle the wedge face 24. The vertical height of the shoes C is made slightly less than the interior height of the friction shell so that no appreciable friction is generated between the wings 25 and the shell and the wings may be said to be out of frictional engagement with the shell. The inner edges of the wings 25 are beveled as indicated at 26 to provide wedge faces extending horizontally, that is, transversely of the friction shell and at right angles to the wedge faces 24 to cooperate with the wedge elements F, hereinafter described.

The main pressure transmitting wedge D is in the form of a relatively heavy block having an outer transverse face 27 bearing against the front follower 16 and a pair of inwardly converging wedge faces 28—28 engageable and cooperable with the wedge faces 24 of the shoes.

The spring follower E bears on the forward end of the main spring B, the rear end of the latter resting against the wall of the casting A. Said spring follower E is in the form of a rectangular plate and, in normal position, is spaced from the inner edges of the shoes C, as indicated in Figs. 1 and 4.

The inner wedges F, two in number, are of like construction and each is of substantially equilateral triangular cross-section, as shown in Fig. 4, thus providing three transversely extending faces 29, 30 and 31. The faces 29 engage with the front side of the follower E and the faces 30 have wedging engagement with the wedge faces 26 of the shoes. The other wedge faces 31 of the wedge elements F have wedging engagement with the auxiliary centrally disposed wedge block G, the latter also extending transversely of the shell and having two side wedge faces 32—32.

The auxiliary wedge block G is normally spaced a slight distance from the inner end of the main wedge D, as shown in Figs. 1 and 4, and is normally held in such position by the compensating spring H which is under compression and adapted to expand when conditions permit.

The retainer bolt J is anchored at its rear end in a hollow boss formed integrally with the casting A, and, at its forward end within a suitable recess provided in the main wedge D, the latter, the wedge block G and the follower E being suitably apertured to accommodate the shank of the bolt.

In operation, assuming an inward or buffing movement of the drawbar, the main wedge D is forced rearwardly thus creating lateral pressure on the shoes C and causing the latter to travel inwardly of the friction shell. The resistance of the main spring B is transmitted to the shoes through the follower E and wedge elements F against the lateral wings 25 of the shoes, and as the resistance of the main spring B gradually increases, the wedge elements F will be gradually forced forwardly with respect to the wings of the shoes, thus in turn forcing the wedge block G outwardly with respect to the main wedge D and compressing the spring H still farther. In release, after removal of the actuating force, the spring H immediately reacts tending to loosen the main wedge D from the shoes, this action being supplemented by the reaction of the main spring which presses on the follower E, which, in turn, tends to force the wedge elements F still further outwardly with respect to the shoes C, in the event the shoes C should stick temporarily to the shell during the initiation of the release action. In this manner, I am enabled to employ the main spring B to assist in disengaging the main pressure-transmitting wedge from the shoes.

In the construction illustrated in Fig. 9, the arrangement of parts is exactly the same as that shown in the other figures except that the friction shoes C' are provided with wedge roller seats 40 to accommodate antifriction rollers 41 which are employed between the shoes C and wedge faces of the main pressure-transmitting wedge D'.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having interior friction surfaces; of friction-shoes cooperable with said shell; a main pressure transmitting wedge cooperable with the shoes; a main spring resistance; a spring follower; inner wedge elements between said follower and the shoes; and wedge means interposed between said inner wedge elements and the main wedge.

2. In a friction shock absorbing mechanism, the combination with a friction shell having interior friction surfaces; of friction-shoes cooperable with said shell; a main pressure transmitting wedge cooperable with the shoes; a main spring resistance; a spring follower; inner wedge elements between said follower and the shoes; a centrally disposed wedge block cooperable with said inner wedge elements; and a compensating spring interposed between said wedge block and the main wedge.

3. In a friction shock absorbing mechanism, the combination with a friction shell having interior friction surfaces extending longitudinally; of wedge friction-shoes cooperable with the shell; a main pressure-transmitting wedge cooperable with the shoes; a main spring resistance; a spring follower; inner wedge elements interposed between said follower and the shoes and having wedge engagement with the latter at right angles to the wedge engagement between the main wedge and the shoes; and wedge means interposed between said inner wedge elements and the main wedge.

4. In a friction shock absorbing mechanism, the combination with a friction shell having interior friction surfaces extending longitudinally; of wedge friction-shoes cooperable with the shell; a main pressure-transmitting wedge cooperable with the shoes; a main spring resistance; a spring follower; inner wedge elements interposed between said follower and the shoes and having wedge-engagement with the latter at right angles to the wedge-engagement between the main wedge and the shoes; a central wedge block cooperable with said inner wedge elements; and a compensating spring interposed between said wedge block and the main wedge.

5. In a friction shock absorbing mechanism, the combination with a friction shell of substantially rectangular form having a pair of interior opposed friction surfaces; of a pair of friction-shoes having outer friction surfaces cooperable with the shell friction surfaces, each shoe being provided with an inwardly extended pair of lateral wings and a wedge face between said wings extending at right angles to the latter; a main wedge cooperable with the wedge faces of the shoes; a main spring resistance; a spring follower; inner wedge elements extending lengthwise of said wings and having wedge-engagement with the latter and also bearing upon said spring follower; and wedging means interposed between said wedge elements and the main wedge.

6. In a friction shock absorbing mechanism, the combination with a friction shell of substantially rectangular form having a pair of interior opposed friction surfaces; of a pair of friction-shoes having outer friction surfaces cooperable with the shell friction surfaces, each shoe being provided with an inwardly extended pair of lateral wings and a wedge face between said wings extending at right angles to the latter; a main wedge cooperable with the wedge faces of the shoes; a main spring resistance; a spring follower; inner wedge elements extending lengthwise of said wings and having wedge-engagement with the latter and also bearing upon said spring follower; a central wedge block interposed between said wedge elements; and a compensating spring interposed between said wedge block and the main wedge.

7. In a friction shock absorbing mechanism, the combination with a casting having a friction shell and a spring cage formed integrally; of a spring resistance disposed in said cage; a pair of friction-shoes cooperable with the shell and oppositely disposed, each shoe having an outer friction surface and a pair of inwardly extended wings at right angles thereto and a wedge face between the wings; of a main pressure-transmitting wedge cooperable with the wedge faces of the shoes and disposed partly between the wings of the shoes; a follower at the end of the main spring resistance adjacent the shoes; a pair of wedge elements bearing on the outer side of said follower, said wedge elements extending parallel to the wings of the shoes and having wedge-engagement with the inner edges of the latter; a wedge block interposed between said wedge elements and cooperable with the latter, said wedge block being normally slightly spaced from the main wedge; and a compensating spring interposed between said wedge block and the main wedge.

In witness that I claim the foregoing I have hereunto subscribed my name this 17th day of Oct., 1921.

JOHN F. O'CONNOR.

Witnesses:
   CARRIE GAILING,
   ANN BAKER.